(12) United States Patent
Castronuovo et al.

(10) Patent No.: US 12,049,395 B2
(45) Date of Patent: Jul. 30, 2024

(54) LIFT

(71) Applicant: BRILLIANT STAGES LIMITED, Pontefract (GB)

(72) Inventors: Giorgio Castronuovo, Pontefract (GB); James Kempf, Pontefract (GB)

(73) Assignee: Brilliant Stages Limited, West Yorkshire (GB)

( * ) Notice: Subject to any disclaimer, the term of this patent is extended or adjusted under 35 U.S.C. 154(b) by 425 days.

(21) Appl. No.: 16/981,459

(22) PCT Filed: Mar. 15, 2019

(86) PCT No.: PCT/GB2019/050738
§ 371 (c)(1),
(2) Date: Sep. 16, 2020

(87) PCT Pub. No.: WO2019/175601
PCT Pub. Date: Sep. 19, 2019

(65) Prior Publication Data
US 2021/0070591 A1 Mar. 11, 2021

(30) Foreign Application Priority Data
Mar. 16, 2018 (GB) ...................................... 1804268

(51) Int. Cl.
*B66F 7/06* (2006.01)
*E04H 3/12* (2006.01)
*B66F 7/28* (2006.01)

(52) U.S. Cl.
CPC ........... *B66F 7/0666* (2013.01); *E04H 3/126* (2013.01); *B66F 7/065* (2013.01); *B66F 7/28* (2013.01)

(58) Field of Classification Search
CPC .. B66F 3/06; B66F 7/0666; B66F 3/22; B66F 13/005; F16M 2200/061; F16G 13/20
See application file for complete search history.

(56) References Cited

U.S. PATENT DOCUMENTS 2,937,852 A * 5/1960 Clarke .................... B66F 7/065
254/122
3,228,659 A 1/1966 Sturm
(Continued)

FOREIGN PATENT DOCUMENTS

CN 103552948 A 2/2014
CN 204801748 U 11/2015
(Continued)

OTHER PUBLICATIONS https://www.rigidchainlifts.co.uk/gallery (Year: 2024).*
(Continued)

*Primary Examiner* — Mahdi H Nejad
(74) *Attorney, Agent, or Firm* — Saxton & Stump, LLC

(57) ABSTRACT

A scissor lift (100) for use in a stage assembly includes a base portion (110) configured to be supported on a floor or other support surface and a top portion (120) configured to support a platform. A scissor arm assembly (130) connects the base portion (110) and the top portion, and a rigid chain lifting system (150) comprising a rigid chain (151) connecting the base portion (110) and the top portion (120). Extension and retraction of the rigid chain (151) causes the top portion (120) to rise and fall with respect to the base portion (110). The use of a rigid chain lifting system (150) means that the scissors (130) are provided for guidance rather than applying load. The scissor lift (100) can be used in conjunction with one or more passive scissors (200), couplable to the scissor lift (100).

22 Claims, 13 Drawing Sheets

(56) References Cited

U.S. PATENT DOCUMENTS

| | | | | |
|---|---|---|---|---|
| 3,350,065 A | * | 10/1967 | Mankey | B66F 3/22 187/269 |
| 3,628,771 A | * | 12/1971 | Egeland | B66F 7/065 187/269 |
| 3,823,915 A | * | 7/1974 | Koehler | B66F 7/065 254/122 |
| 2008/0105498 A1 | * | 5/2008 | Perkins | B66F 11/042 187/269 |
| 2008/0224107 A1 | * | 9/2008 | Polins | E06B 5/01 254/45 |
| 2008/0315167 A1 | * | 12/2008 | Takeuchi | B66F 3/06 254/358 |
| 2010/0223901 A1 | | 9/2010 | Ando et al. | |
| 2012/0272584 A1 | * | 11/2012 | Bilsen | E04H 3/28 52/7 |
| 2016/0107870 A1 | * | 4/2016 | Taylor | B66F 3/46 60/420 |
| 2017/0050833 A1 | | 2/2017 | Ooe | |
| 2019/0039866 A1 | * | 2/2019 | Ooe | B66F 17/00 |

FOREIGN PATENT DOCUMENTS

| | | | |
|---|---|---|---|
| CN | 205637803 U | | 10/2016 |
| CN | 106276691 A | | 1/2017 |
| CN | 206016334 U | | 3/2017 |
| CN | 206328091 U | | 7/2017 |
| CN | 206938916 U | * | 1/2018 |
| CN | 109476470 A | * | 3/2019 |
| DE | 102009047600 A1 | | 7/2010 |
| EP | 2147891 A1 | | 1/2010 |
| FR | 2917727 A1 | | 12/2008 |
| JP | 2009280365 A | | 12/2009 |
| JP | 2010001129 A | | 1/2010 |
| JP | 2013212904 A | * | 10/2013 |

OTHER PUBLICATIONS

A supplementary cabinet capable of automatically lifting; CN-106144950-A; Inventor: Ge, Qiu-ju; Date Filed: Aug. 22, 2016; Date Published: Nov. 23, 2016 (Year: 2016).*

An automatic lifting feeding device for rural household garbage treating in system and working method thereof; Document ID: CN-106395679-A; Date Published: Feb. 15, 2017; Date Filed: Oct. 18, 2016; Inventor: Liang, Zhi (Year: 2017).*

International Search Report and Written Opinion for Application No. PCT/GB2019/050738 dated Jun. 5, 2019 (16 pages).

United Kingdom Patent Office Action for Application No. GB1804268.9 dated Aug. 24, 2018 (5 pages).

Tianhe Telescopic Mast, "Rigid chain lifting platform," <https://www.youtube.com/watch?v=WM9eJIWCVRc&feature=youtu.be> dated Sep. 12, 2017.

SERAPID, "Large Mechanical Scissor Lift Platform—www.serapidusa.com," <https://www.youtube.com/watch?=H_ohUkFwAFk&feature=youtu.be> dated Jan. 10, 2011.

* cited by examiner

LIFT

FIELD

The present invention relates to a scissor lift for use in a stage assembly. The invention further relates to a system comprising the scissor lift, a passive scissor for use in a stage assembly, and a stage assembly.

BACKGROUND

As well as complex lighting design and sound design, the modern touring music industry employs highly complex staging and set design in order to deliver engaging and entertaining shows, concerts or gigs. The staging may involve complex moving parts, for example in order to convey artists, musical equipment, lighting equipment or other stage equipment during the course of the performance.

It is common for even the most complex shows to be repeated in consecutive nights in different venues. Accordingly, there is a need for these complex staging systems to be rapidly assembled before the show, rapidly dissembled after the show and suitable for packing down in a compact manner for transport between venues, by road, air or boat.

In addition, even for large shows it is typical for a small number of staff to travel with the show to oversee the assembly, disassembly and packing down of the staging, with the bulk of the labour being carried out by locally-hired staff. The locally-hired staff are unlikely to be familiar with the specific staging set-up of the particular show and will have a very limited window of time to become familiar with the way in which the staging is to be assembled. This can be exacerbated in international touring, where the locally-hired staff may not speak the same language as the touring staff.

Accordingly, there is a need to provide stage equipment that supports the complex set design demanded by stage designers and artists, whilst being easy to assemble, dissemble and pack down.

It is an object of the invention to provide a scissor lift that overcomes at least some of the above-mentioned disadvantages, and any other disadvantages that may be apparent to the skilled reader from the description herein and/or their knowledge of traditional scissor lifts. It is a further object of the invention to provide a compact, lightweight scissor lift for use as part of a stage assembly.

SUMMARY

According to the present invention there is provided an apparatus and method as set forth in the appended claims. Other features of the invention will be apparent from the dependent claims, and the description which follows.

According to a first aspect of the invention there is provided a scissor lift for use in a stage assembly comprising:
- a base portion configured to be supported on a floor or other support surface;
- a top portion configured to support a platform;
- a scissor arm assembly connecting the base portion and the top portion;
- a rigid chain lifting system comprising a rigid chain connecting the base portion and the top portion, wherein the scissor lift is configured such that extension and retraction of the rigid chain causes the top portion to rise and fall with respect to the base portion.

When used herein, the term "stage assembly" refers to a collection of components arranged to form a stage or other performance space, for use in a performance or event such as a concert, gig, corporate conference or other show. The components may comprise staging, platforms, decks, lighting, musical equipment and the like.

The rigid chain lifting system may comprise a pair of rigid chains.

The rigid chain lifting system may comprise an electric motor, preferably an AC servo motor, to extend and retract the rigid chain, preferably from a magazine. The motor may drive an axle, preferably via a gearing assembly, the axle comprising a chain gear portions arranged to engage the rigid chain. The axle may comprise a pair of chain gear portions arranged to engage a respective one of the pair of rigid chains. The gearing assembly may be a reduction gear head.

The rigid chain lifting system may comprise a safety brake, configured to be released upon supply of power to the electric motor and engaged upon cessation of the supply of power to the electric motor. The safety brake may be configured to engage a brake gear portion of the axle. The rigid chain lifting system may comprise a primary encoder, configured to determine the extent to which the rigid chain is deployed based on the motion of the motor. The rigid chain lifting system may comprise a secondary encoder, configured to determine the extent to which the rigid chain is deployed based on the motion of the axle. The rigid chain lifting system may be configured to engage the safety brake if the output of the primary encoder and secondary encoder indicate the rigid chain is deployed to a different extent.

The rigid chain lifting system may be disposed in the base portion.

One or more, but preferably each, of the base portion, the top portion and the scissor arm assembly may comprise aluminium. One or more, but preferably each, of the base portion, the top portion and scissor arm assembly may be formed of aluminium.

The base portion may be connected to the scissor arm assembly with mechanical fasteners. The top portion may be connected to the scissor arm assembly with mechanical fasteners.

The base portion and/or top portion may comprise components connected with mechanical fasteners. The scissor arm assembly may comprise components connected with mechanical fasteners. The top portion and/or base portion may comprise a plate and a flange arranged around the edge of the plate. The top portion and/or base portion may comprise a plurality of braces. The plate, flange and optionally the braces may be connected to each other by mechanical fasteners.

The scissor arm assembly may comprise two parallel subassemblies. The scissor arm subassemblies may face each other. The scissor arm subassemblies may be spaced apart.

The scissor arm subassemblies may each comprise a pair of crossed arms connected at a pivot point, forming a scissor. The scissor arm subassemblies may each comprise a plurality of scissors connected to each other. The scissor arm subassemblies may each comprise two scissors, so as to form a double scissor. The scissor arm subassemblies may be symmetrical in a notional vertical plane extending through pivot points of the scissors. The or each rigid chain may be arranged between the scissor arm subassemblies, preferably on the notional vertical plane.

Uppermost ends of uppermost arms of each scissor subassembly may be slidably attached to the top portion. The uppermost arms may each comprise a support arm, pivotally attached between the uppermost arms and the top portion.

Lowermost ends of lowermost arms of each scissor subassembly may be slidably attached to the base portion. The lowermost arms may each comprise a support arm, pivotally attached between the lowermost arms and the base portion.

The scissor lift may comprise a plurality of bracing plates extending between the scissor arm subassemblies. The bracing plates may be configured to move to a nested configuration when the rigid chain is retracted. In the nested configuration, a lowermost of the bracing plates may form a bridge over the lifting system.

The top portion may comprise a plurality of mounting points configured for the mounting of the platform thereto. Each mounting point may be adjustable in x, y and z directions.

The height of the scissor lift in a fully retracted state may be under 1 m, preferably under 0.75 m, more preferably under 0.5 m, most preferably under 0.4 m. The height of the scissor lift in a fully extended state may be at least 1.5 m, preferably at least 1.75 m, more preferably at least 2 m, most preferably the height is 2.35 m. The length of the base portion and/or top portion may be approximately 2 m. The width of the base portion and/or top portion may be approximately 1 m. The weight of the scissor lift may be under 1 ton, preferably under 0.75 ton, more preferably under 0.5 ton. The scissor may be operable to lift a load of at least 0.5 ton, preferably 0.75 ton.

The base portion may comprise one or more wheels. The wheels may comprise casters. The wheels may be configured to be raised and lowered. The base portion may comprise a plurality of support legs. The support legs may be configured to be raised or lowered.

According to a second aspect of the invention there is provided a stage system comprising at least one scissor lift as defined in the first aspect and an automation control system configured to remotely control the at least one scissor lift.

According to a third aspect of the invention there is provided a passive scissor for use in a stage assembly comprising:
  a base portion configured to be supported on a floor or other support surface;
  a top portion configured to support a platform;
  a scissor arm assembly connecting the base portion and the top portion,
  wherein the passive scissor is couplable to the scissor lift defined in the first aspect, such that the rise and fall of the top portion of the scissor lift causes the rise and fall of the top portion of the passive scissor.

The passive scissor may not comprise a lifting system.

The passive scissor may be directly coupled to the scissor lift. The passive scissor may be coupled to the scissor lift via a further passive scissor.

The scissor assembly may comprise a single subassembly.

The passive scissor may comprise a plurality of mounting points configured for the mounting of the platform thereto. Each mounting point may be adjustable in x, y and z directions.

Preferable features of the scissor assembly of the passive scissor may be as defined above in respect of the scissor assemblies of the scissor lift of the first aspect.

According to a fourth aspect of the invention there is provided a stage assembly comprising a scissor lift as defined in the first aspect.

The stage assembly may comprise a passive scissor as defined in the third aspect.

The stage assembly may comprise a platform. The platform may be mountable to the top portion of the scissor lift. The platform may be mountable to top portion of the passive scissor. The platform may be mountable to both the top portion of the scissor lift and the top portion of the passive scissor.

The stage assembly may comprise a plurality of passive scissors. The stage assembly may comprise a plurality of scissor lifts. The or each scissor lift may be coupled to a plurality of passive scissors.

BRIEF DESCRIPTION OF DRAWINGS

For a better understanding of the invention, and to show how embodiments of the same may be carried into effect, reference will now be made, by way of example only, to the accompanying diagrammatic drawings in which.

Figure 1:
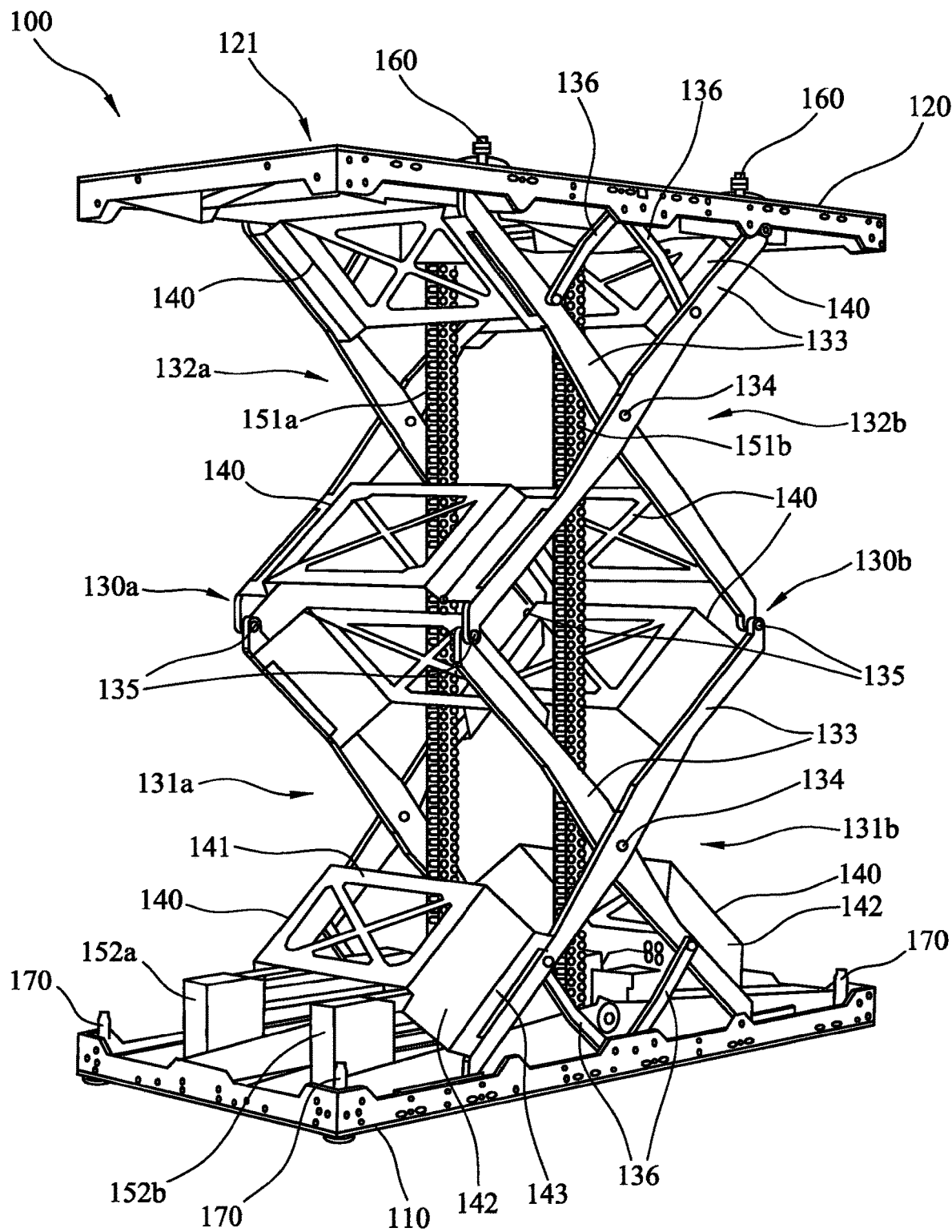
FIG. 1 is a perspective view of an exemplary scissor lift in an extended state.
Figure 2:
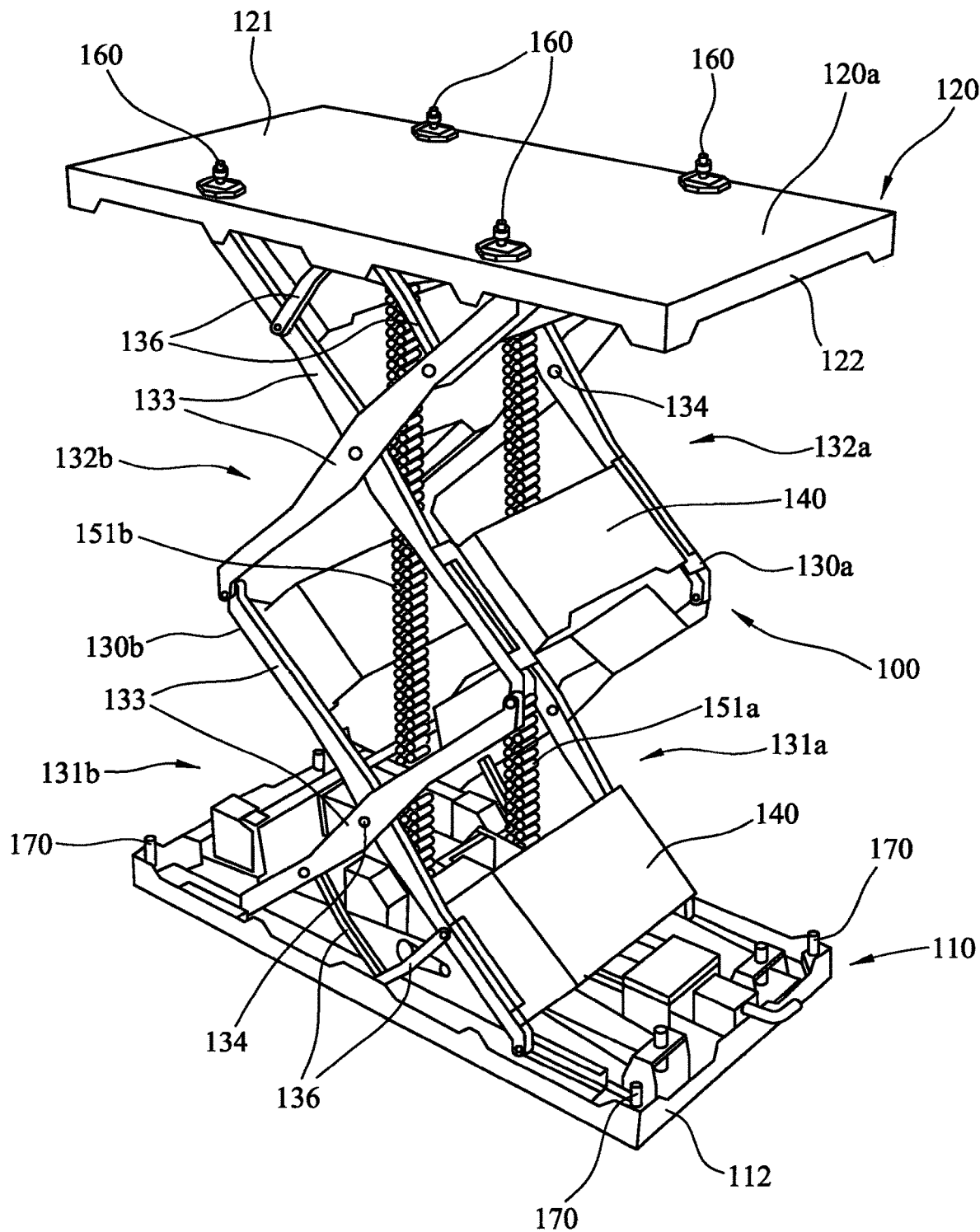
FIG. 2 is a perspective view of the exemplary scissor lift of FIG. 1 in an extended state.
Figure 3:
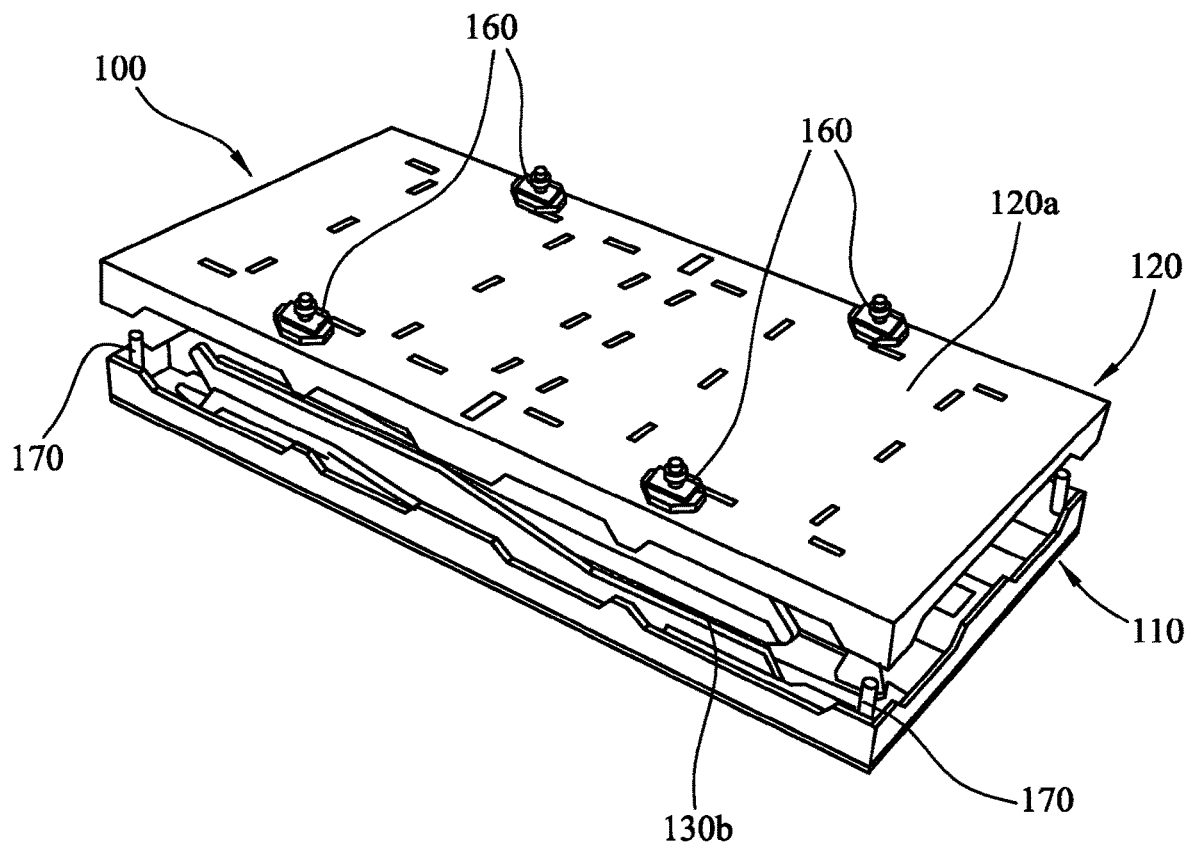
FIG. 3 is a perspective view of the scissor lift of FIGS. 1 and 2 in a retracted state.
Figure 4:
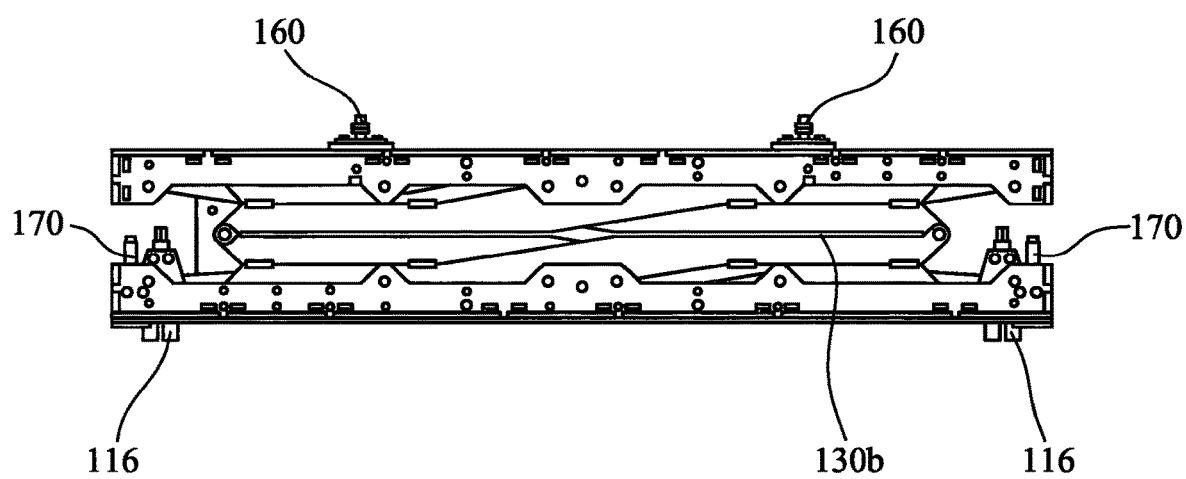
FIG. 4 is a front view of the scissor lift of FIGS. 1-3 in a retracted state.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DESCRIPTION OF EMBODIMENTS

In overview, examples of the invention provide a scissor lift suitable for lifting a performer, props or other relatively lightweight stage equipment as part of a stage assembly, which employs a rigid chain lifting system. Further examples of the invention provide a passive, unpowered, scissor, which can be coupled to the scissor lift.

FIGS. 1-10 show an exemplary scissor lift 100. The lift 100 comprises a base portion 110, which is arranged on the floor or another support surface in use, and a top portion 120, upon which a load can be placed in order to be lifted.

The base and top portions 110/120 each take the form of substantially rectangular plate 111/121, with a flange 112/122 extending around the periphery of the plate 111/121 so as to effectively define a tray. The flanges 112/122 extend towards each other. In other words, the flange 112 extends upwardly from the plate 111, whereas the flange 122 extends downwardly from the plate 121. In one example, the top and base portions 110/120 are formed from sheet metal (e.g. aluminium). In one example, the flanges 112/122 extend substantially orthogonally from their respective plate 111/121.

Figure 5:
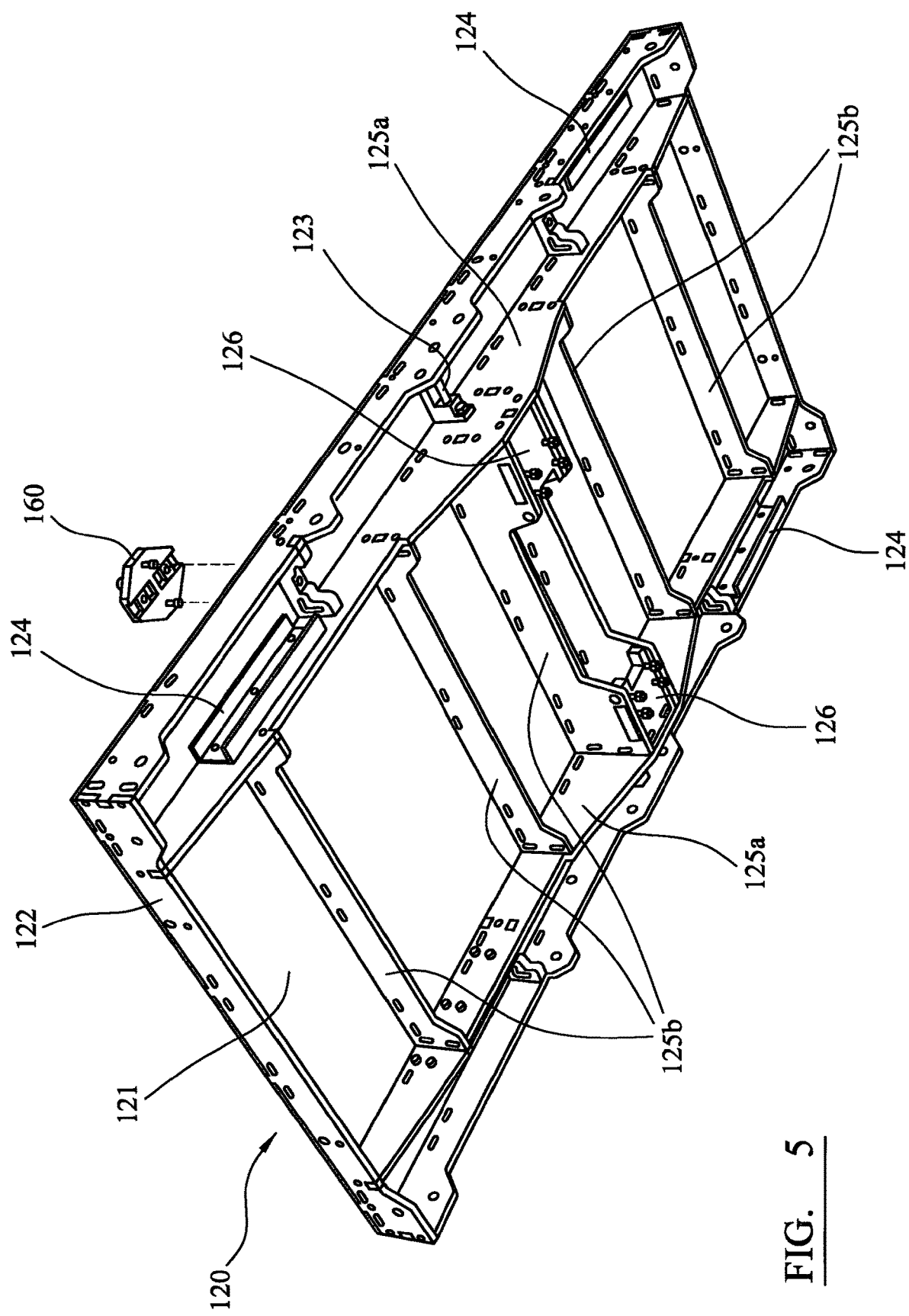
FIG. 5 is a perspective view of the underside of a top portion of the scissor lift of FIGS. 1-4.

As can be best seen in FIG. 5, the top portion 120 comprises a plurality of braces 125. In one example, the braces 125 comprise a pair of longitudinal braces 125a, extending in parallel between the short sides of the rectangular plate 121, with cross braces 125b extending between the longitudinal braces 125a. Accordingly, the top portion 120 is prevented from flexing or distorting under load. The top portion 120 also comprises chain attachment points 126, to which the chains 151 (discussed in detail below) are attached.

As can be seen in FIGS. 1-5 and 7-8, the top portion 120 furthermore comprises a plurality of mounting points 160. The mounting points 160 are connectable to a platform (not shown) or other piece of staging. The mounting points 160 protrude upwards from an upper surface 120a of the top portion 120. In one example, the top portion 120 comprises four mounting points 160, distributed at corners of a notional rectangle on the upper surface 120a. The structure of the mounting points 160 will be described in more detail below. Additionally or alternatively, the top portion 120 may also be provided with a plurality of holes (e.g. tapped holes) to which a platform may be attached. In some examples, the holes may serve as the attachment point for the mounting points 160 to the top portion 120. Accordingly, a user may choose whether to employ the mounting points 160 or to directly couple a platform to the holes. The holes may also be configured to receive lifting pins, to assist in the handling of the lift 100. In one example, the holes extend into a profile (i.e. a block of material) arranged on the underside of the top portion 120. The profile is for example formed of steel or aluminium.

Figure 6:
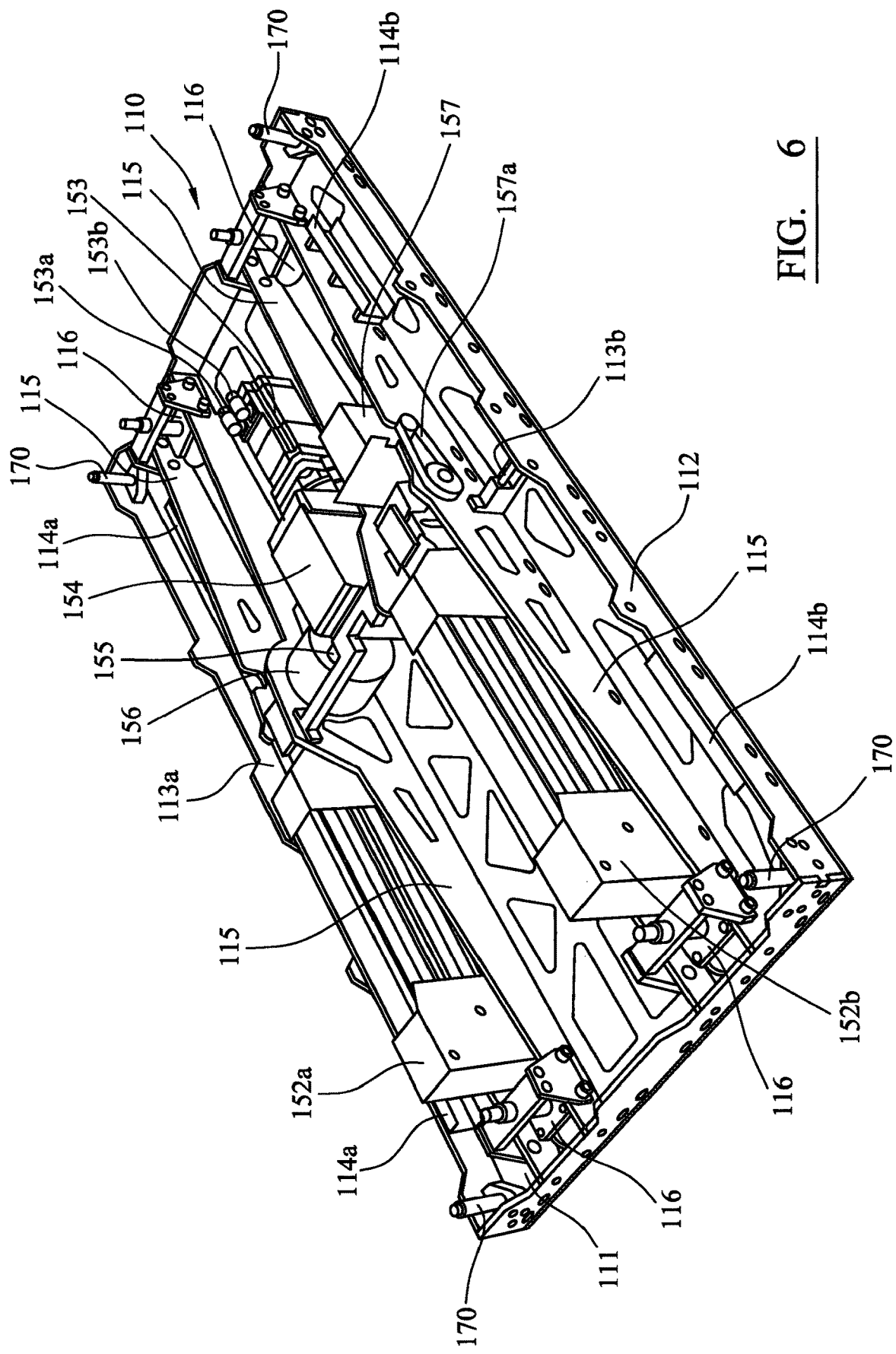
FIG. 6 is a perspective view of the top of a base portion of the scissor lift of FIGS. 1-5.

As can be best seen in FIG. 6, the base portion 110 comprises four longitudinal braces 115, extending in parallel between the short sides of the rectangular plate 111.

In one example, the base portion 110 comprises a plurality of caster wheels 116, for example 4 caster wheels arranged proximate to the corners of the base portion 110. The casters 116 may be recessed from the underside of the base portion 110, such that only a portion of each wheel protrudes from the underside of the plate 111. In one example, the base portion 110 comprises a plurality of support legs 170. The support legs 170 are configured to be lowered down from the lower surface of the base portion 110, so as to raise the base portion 110. Accordingly, the wheels 116 become disengaged from the floor, thus preventing the base portion 110 from moving during use. In addition, the support legs 170 may be individually adjusted in order to allow the base portion 110 to be levelled. Alternatively or additionally, the wheels 116 can be raised and lowered, either to level the base portion 110 in its wheeled configuration, or to disengage the wheels 116 from the floor in favour of the support legs 170.

The lift 100 further comprises a scissor assembly 130 that comprises pair of scissor subassemblies 130a, 130b, which extend between the top portion 110 and the base portion 120. The scissor subassemblies 130a/b are spaced apart, and are formed proximate to the longer edges or the rectangular plates 111/121. The scissor subassemblies 130 are parallel, and disposed to face each other (i.e. they are adjacent). Accordingly, the scissor subassemblies 130a/b are symmetrical in a notional vertical plane disposed between the subassemblies 130a/b, equidistant the assemblies 130a/b. Each scissor subassembly 130 comprises a first, lower scissor 131 and a second, upper scissor 132, so that the assemblies 130a/b each take the form of a double scissor.

Each scissor 131/132 comprises a pair of crossed arms 133, rotatably connected at a pivot point 134 located at the meeting point of the arms 133.

The lower ends of the arms 133 of lower scissors 131a/b are slidably attached to the base portion 110. The arms 133 of lower scissors 131a/b are also connected to the base portion 110 by virtue of secondary support arms 136. The arms 136 are pivotally connected to the lower scissor arms 133 at a position approximately ¼ of the way along their extent from the base portion 110. The arms 136 are also pivotally connected to the base portion 110 at a hinging point 113 between the sliding attachment points of the arms 133.

Figure 8:
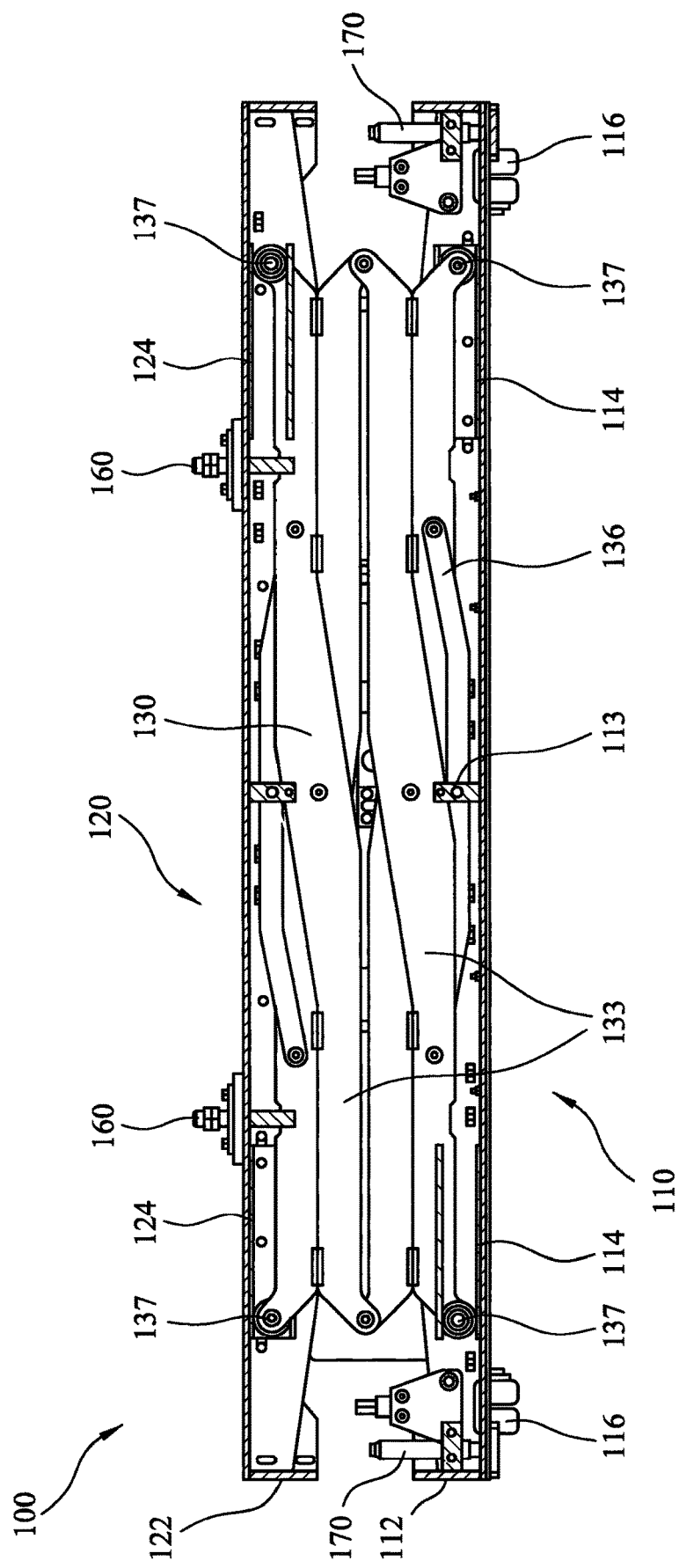
FIG. 8 is a cross-sectional view of the scissor lift of FIGS. 1-7, showing the connection between the scissor assemblies and the top and base portions.

The attachment between the lower scissor 131a/b and the base portion 110 is best understood with reference to FIGS. 6 and 8. As can be seen therein, the base portion 110 comprises tracks 114, each track 114 being arranged to receive a wheel 137 formed on the end of the arms 133 so as to support the sliding motion of the end of the arm 133 with respect to the base portion 110. Furthermore, the hinging portion 113 takes the form of a bar arranged to extend through apertures formed on the end of the support arms 136

The upper ends of the arms 133 of the upper scissors 132a/b are slidably attached to the top portion 120 in a similar manner, as can be seen in FIG. 5, which shows the underside of the top portion 120. In particular, the support arms 136 of the upper scissors 132 are connected to hinging point 123, and wheels 137 of the arms 133 of the upper scissors 132 are received in tracks 124.

The upper ends of the arms 133 of the lower scissor 131 are pivotally connected to the lower ends of the arms 133 of the upper scissor 132 at pivot points 135.

In one example, the upper and lower scissors 131/132 are of the same size, and thus each scissor subassembly 130a/b, and thus the scissor assembly 130 as a whole, is symmetrical about a notional vertical line extending perpendicularly to the surface of the plates 111/121 and through the pivot points 134 of the scissors 131,132. In addition, in one example the pivot point 134 may be located substantially equidistant from the ends of the arms 133. Accordingly, each scissor subassembly 130a/b may also be symmetrical about a notional horizontal line extending through the pivot points 135 of the scissors 131,132.

At least one of, but preferably all of, the base portion 110, the top portion 120 and the scissor assembly 130 are formed of a lightweight material, preferably a lightweight metal, for example aluminium. Alternatively or in addition, at least one of, but preferably all of, the base portion 110, the top portion 120 and the scissor assembly 130 are formed by mechanical fastening. In other words, the flanges 112/122, plates 111/121, braces 115/125, arms 133/136 are attached to each other by nuts and bolts, or other suitable mechanical fasteners. Accordingly, the lift 100 as a whole is not welded, save for in respect of the construction of minor components such as the caster wheels 116. Avoiding using welding prevents the warping of components (e.g. during fabrication due to the sheet metal being affected by heat), ensuring that the lift 100 can be precisely manufactured and operated.

The lift 100 further comprises a rigid chain lifting system 150. The rigid chain lifting system comprises a pair of rigid chains 151. The rigid chains 151 act as the lifting mechanism of the lift 100, taking the place of traditional hydraulic rams or the like.

One end of each chain 151 is connected to the underside of the top portion 120, and the other end of the chain is retained in a magazine 152 attached to the base portion 110. The chains 151 are movable between a retracted position, in which a substantial portion of each chain 151 is retained in the magazine 152 attached to the base portion 110, and an extended position, in which the chains 151 extend substantially vertically between the base portion 110 and the top portion 120. The structure of the chains 151 is such that the vertical chain is substantially rigid, so that it is able to support the weight of the top portion 120 and any load placed thereupon. Accordingly, the extension/retraction of the chain raises/lowers the top portion 120 between a lowermost or retracted position and an uppermost or extended positon. The scissor assembly 130 is able to effectively act as a guide only, rather than being substantially load-bearing, because the weight is supported by the chains 151. In one example, the chains 151 are SERAPID® chains, such as SERAPID® LinkLift 30 chains.

The rigid chain lifting system 150 will now be explained in more detail with reference to FIG. 6. As can be seen therein, the lifting system 150 comprises the magazines 152a/b for retaining respective rigid chains 151a/b in a substantially horizontal configuration. The system 150 further comprises a motor 153, gearing assembly 154 and axle 155.

The axle 155 extends across the base portion 110 in a direction between the two longer edges of the plate 111 at a position approximately equidistant the short edges of the plate 111, though it will be understood that axle 155 need not be precisely equidistant from the short edges. Gearing portions comprising teeth (not shown) are formed at respective ends of the axle 155, which engage with respective rigid chains 151a/b. Accordingly, rotation of the axle 155 drives the chains 151 between the extended and retracted positions. Furthermore, the use of a common axle for both chains 151 ensures the chains 151 are driven synchronously.

The motor 153 is configured to drive the axle 155. The motor 153 may drive the axle 155 via the gear assembly 154, as discussed below. However, it will be understood that in other examples the motor may drive the axle 155 directly. In one example, the motor 153 is an AC servo motor, driven by mains power received at port 153a. The servo motor delivers its maximum torque with a very low lag, which allows for precise control of the lift 100. This is highly advantageous in performance applications, in which the motion of the lift 100 must be synchronised with the music, the motion of other equipment and lighting effects.

The motor 153 comprises a dynamic brake, which is operable to hold the axle 155 in a fixed position. In addition, the motor 153 comprises a primary encoder (not shown), which is operable to sense the extent to which the chains 151 have been extended or retracted based on the operation of the motor 153.

The motor 153 is positioned transverse to the axle 155 at the opposite side of the axle to the magazines 152a/b, and thus the gearing assembly 154 is arranged between the motor 153 and the axle 155 in order to convert the drive of the motor 153 to rotate the axle 155. In one example, the gearing assembly 154 comprises a helical bevel gear, and acts as a reduction gear head.

In one example, the rigid chain lifting system 150 comprises a safety brake 156. The safety brake 156 is arranged to, when activated, interfere with a further gearing portion of the axle 155. For example the safety brake 156 may be a substantially cylindrical body, which surrounds the further gearing portion, and which comprises projections configured to mesh with the gearing portion upon activation of the brake 156. Accordingly, the activated safety brake 156 prevents the rotation of the axle 155, thereby fixing the position of the top portion 120 with respect to the base portion 110. In one example, the safety brake 156 is arranged at one end of the axle 155.

The safety brake 156 is configured to permit the rotation of the axle 155 upon receipt of power. In other words, in its default, unpowered state, the brake 156 prevents rotation of the axle 155, and thus motion of the chains 151. The rigid chain lifting system 150 is configured such that, when power is supplied to activate the motor 153 and move the chains 151, power is also provided to the safety brake 156 to permit rotation of the axle 155. When power ceases to be applied to the motor 153 (e.g. because the lift is in its desired position), and therefore also the safety brake 156, the safety brake 156 is activated thereby securely holding the platform in position.

The rigid chain lifting system 150 further comprises a limit encoder assembly 157. The limit encoder assembly 157 is connected to the axle 155 by virtue of a belt assembly 157a, and accordingly is able to sense the rotation of the axle. The limit encoder assembly 157 fulfils two functions. Firstly, it acts as a secondary encoder, configured to sense the extent to which the chains have been extended or retracted based on the rotation of the axle 155. The rigid chain lifting system 150 is configured to compare the output of the primary encoder and the secondary encoder, for example using suitable software/hardware controller (not shown). If the output of the primary encoder and secondary encoder does not match (i.e. the encoders do not agree that the same amount of chain 151 has been deployed from the magazine 152), it is indicative of an error and the power is cut, thereby activating the safety brake 156.

In addition, the limit encoder assembly 157 acts as a limit switch, automatically stopping the motor 153 when the chains 151 are either fully extended (and so the lift 100 is fully extended) or fully retracted (and so the lift 100 is fully retracted).

In one example, the controller is configured to control the motor 153 in order to raise/lower the lift, in response to a control signal. The control signal may be received via cables connected to a port 153b of the motor. It will however be understood by those skilled in the art that other means of delivering the control signals are possible, including via wired or wireless communication links.

Figure 10:
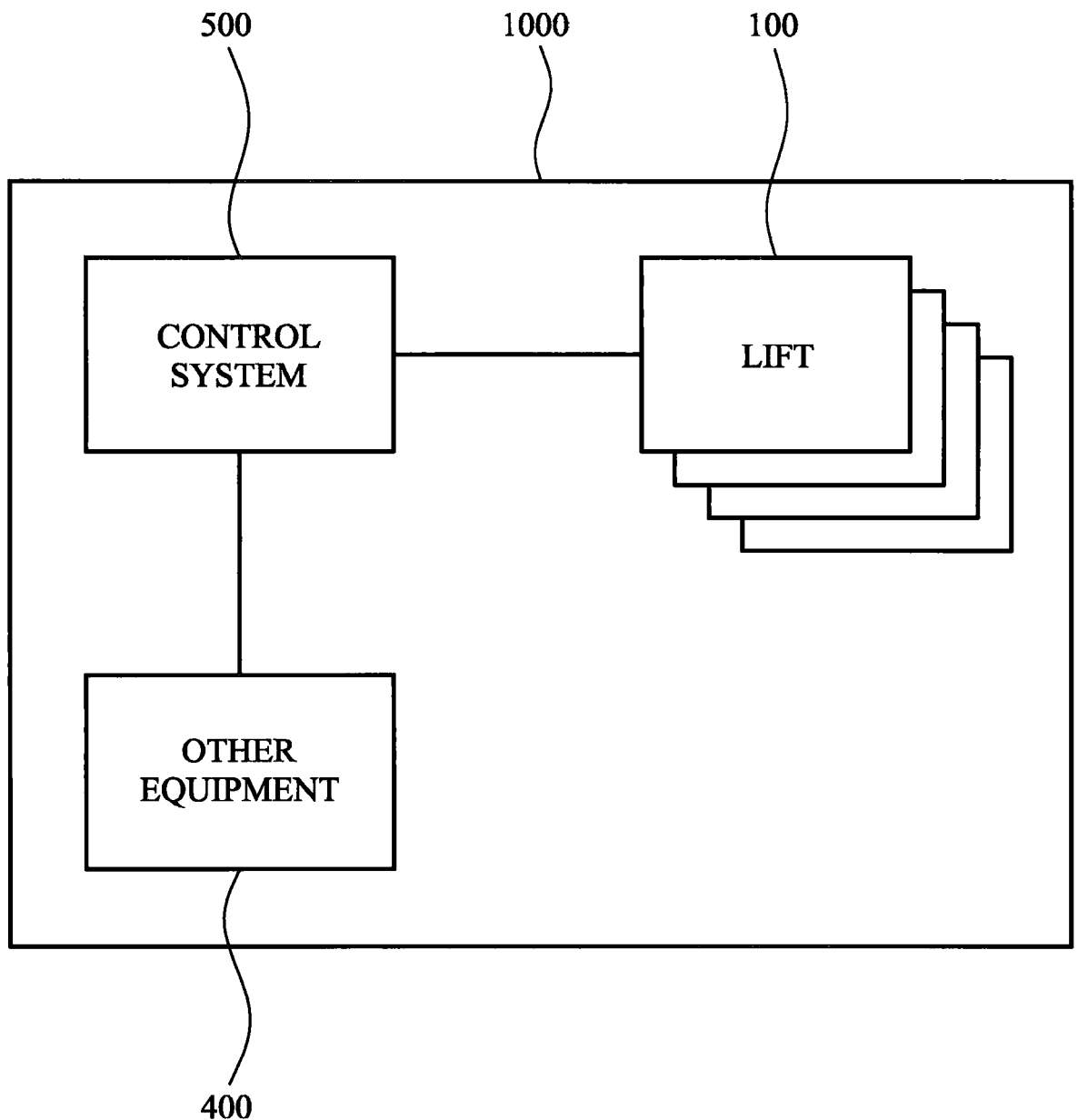
FIG. 10 is a schematic block diagram of an exemplary system comprising a scissor lift and a control system.

In one example, the lift 100 is configured to receive the control signal from a suitable automation control system (500, FIG. 10, such as an automation control console.

As can be best seen in FIG. 10 in one example there is provided a system 1000 comprising the automation control system 500, which is configured to control one or more scissor lifts 100. The automation control system 500 may also be arranged to control various other stage equipment 400.

In one example, the lift 100 further comprises a plurality of bracing plates 140 extending between corresponding locations on the respective scissor subassemblies 130a/b. In particular, bracing plates 140 are arranged on each scissor 131/132 at each side of the pivot point 134, to give a total of 8 plates. The plates 140 ensure that the scissor subassemblies 130a/b remain in their parallel, spaced apart configuration during operation of the lift 100. In one example, the bracing plates 140 are made of a stronger material than the scissor assembly 130, such as steel. The plates 140 are mechanically fastenable to the arms 133.

Figure 13:
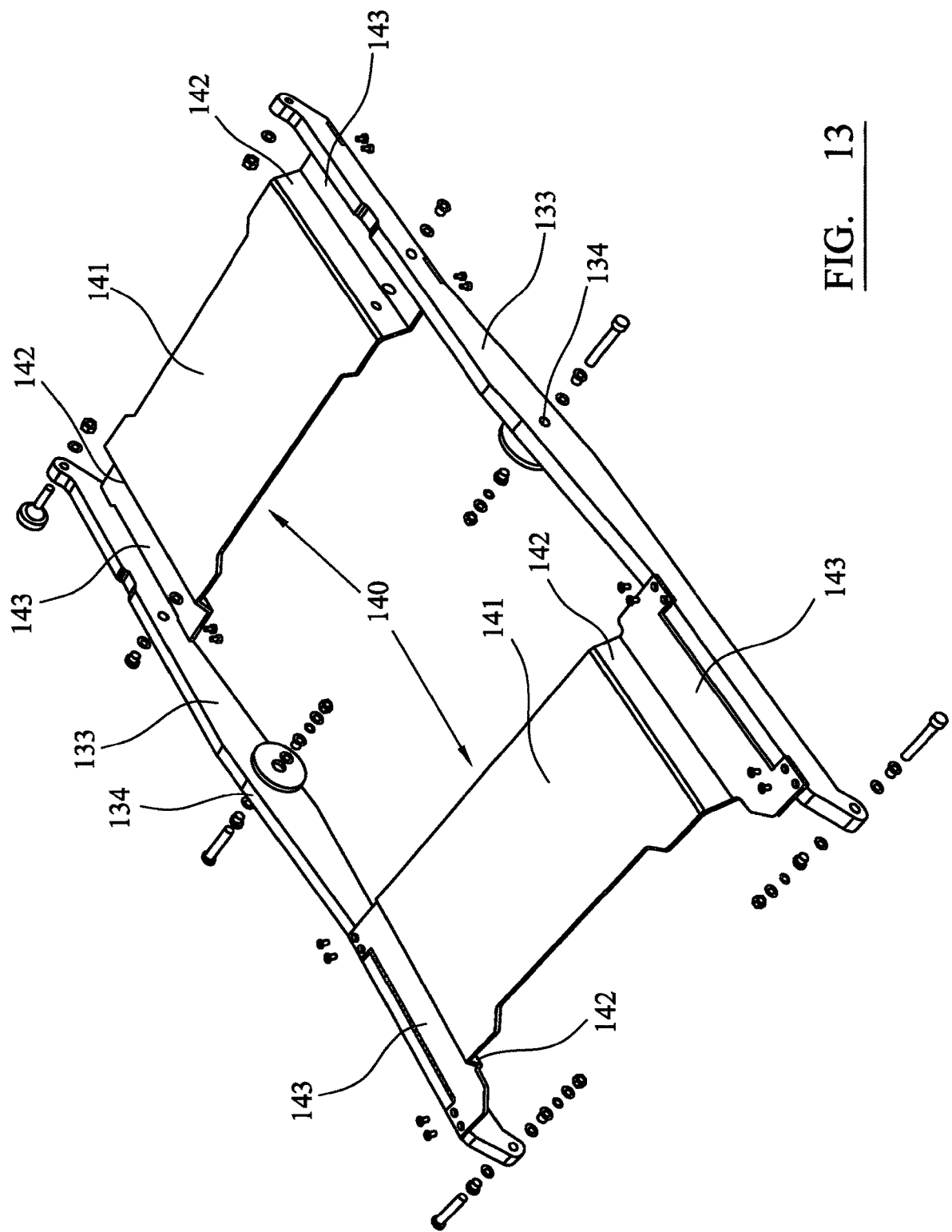
FIG. 13 is a perspective view of bracing plates of an exemplary scissor lift.

As can be best seen in FIG. 13, the bracing plates 140 are substantially trapezoidal in cross-section. Each bracing plate 140 comprises an upper plate 141, angled side plates 142 extending obliquely downward from the upper plate 141 towards the arms 133, and flanges 143 connecting the side plates 142 to the arms 133. Accordingly, once installed, the upper plate 141 is parallel to, yet stands proud of, a notional plane extending between the point at which the flanges 143 connect to the arms 133 of the respective subassemblies 130a/b. In certain examples (e.g. as shown in FIG. 1), the braces 140 comprise cutaway portions.

Figure 7:
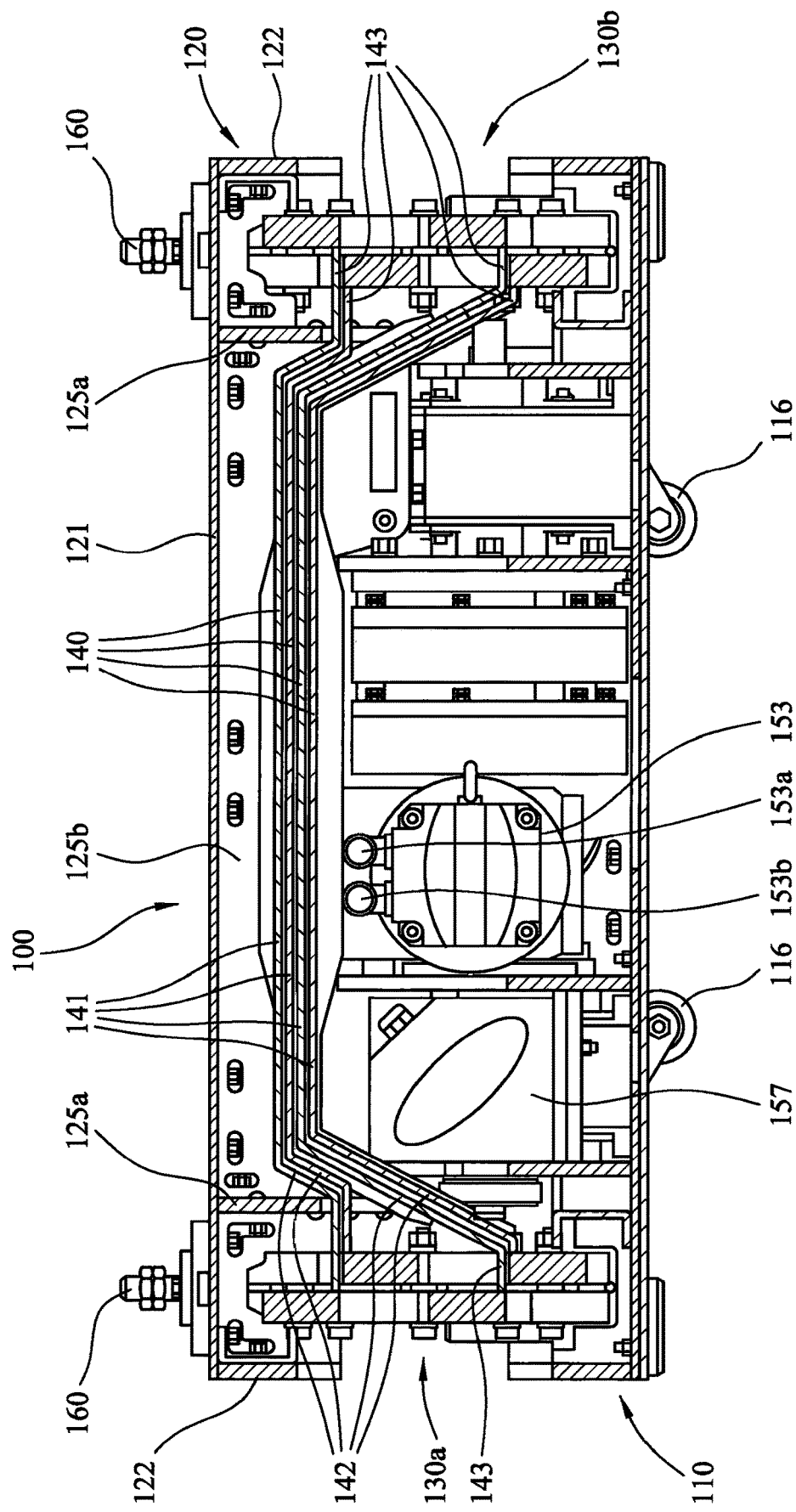
FIG. 7 is a cross-sectional view of the scissor lift along the line A-A shown in FIG. 4.

As can be best seen in FIG. 7, the bracing plates 140 are configured to move to a nested configuration when the lift 100 is at its lowermost, fully retracted, position. In other words, the width of the upper plates 141 (i.e. in the direction between the arms 133) progressively increases from a lowermost bracing plate 140 to an uppermost bracing plate 140, so that when the lift 100 is in its lowermost position, each bracing plate 140 is nested within the bracing plate 140 immediately above it. Furthermore, in the lowermost position, the lowermost of the bracing plates 140 forms a bridge over the lifting system 150. This allows for a low-profile base portion 110, thus decreasing the overall height of the lift 100 in its fully retracted position.

Figure 9:
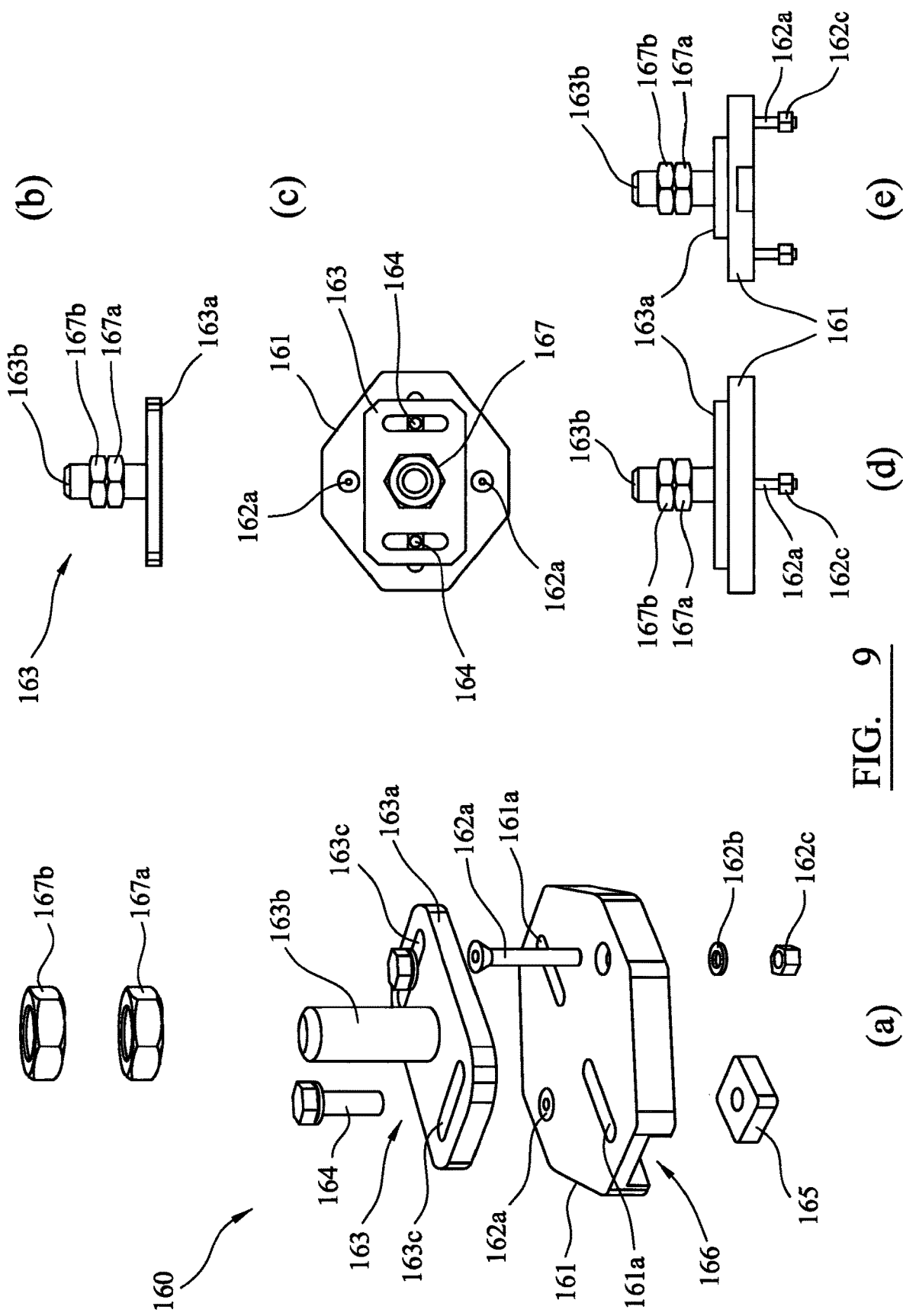
FIGS. 9A-9E are views of an adjustment means of the top portion of the scissor lift of FIGS. 1-8.

Turning now to FIG. 9, the detailed structure of the mounting portion 160 will be discussed. The mounting portion 160 comprises a base portion 161, which is fixed to the upper surface 120a of the top portion 120 by virtue of a fastening means such as bolts 162a, washers 162b and nuts 162c. Stud portion 163, which comprises a plate 163a and a threaded projection 163b upstanding from the plate 163a, is disposed on top of base portion 161. Bolts 164 extend downwardly through elongate slots 163c formed in the stud portion 163 at either side of the projection 163b, then through elongate slots 161a formed in the base portion 161, before being received in sliding blocks 165. The sliding blocks 165 are retained in a channel 166 under the base portion 161, which permits motion of the blocks 165 in the direction of the slot 161a. The elongate slots 163c and 161a are substantially orthogonal to one another.

When the bolts 164 are loosened, the stud portion 163 is permitted to slide with respect to the base portion 161 in a first direction in the horizontal plane (i.e. an x direction), guided by the slots 163c. In addition, the stud portion 163 is also permitted to move in a second direction in the horizontal plane, orthogonal to the first direction (i.e. a y direction), guided by the slots 161a. When the bolts 164 are tightened, the stud portion 163 becomes fixed with respect to the base portion 161.

In addition, the mounting portion 160 comprises a pair of locknuts 167, threadable onto the projection 163b. The lower locknut 167a is threaded onto the projection 163b, a platform or other staging (not shown) is mounted to the projection 163b (for example by extending through an aperture sized to allow passage of the projection 163b but not the locknut 167a), and then the upper locknut 167b is threaded onto the projection 163b, sandwiching the platform between the locknuts.

The position of the lower locknut 167 may be adjusted (i.e. by threading it a longer or shorter distance along the extent of the projection 163b), thereby permitting adjustment of the position of the platform in a vertical plane, orthogonal to the x and y planes (i.e. a z direction).

In one example, the overall dimensions of the scissor lift 100 are as follows. The base portion 110 and top portion 120 are 1 m wide and 2 m long. The lift 100 in its fully extended state is approximately 2.35 m from the upper surface 121a of the top portion 120 to the lower surface of the base portion 120. The lift in its fully retracted state is 0.4 m from the upper surface 121a of the top portion 120 to the lower surface of the base portion 120. In one example, the lift 100 weighs 530 kg, and is rated for a 750 kg safe working load.

In use, the scissor lift 100 is wheeled into position on caster wheels 116. Subsequently, the support legs 170 are deployed or the wheels 116 are raised to fix the lift 100 in positon. Power and control cables are then connected to the ports 153a/b. A platform (not shown) may be mounted to the mounting points 160. In some examples, however, the top surface 120a of the top portion 120 functions as the deck/platform, and so no additional platform is mounted to the lift 100.

In order to raise the lift 100, a control signal is sent to the motor 153, driving the motor 153 to turn the axle 155 (e.g. via gearing assembly 154) in a direction that drives the chains 151 out of their respective magazines 152. As the links of the chains 151 move into a vertical configuration, they become rigid and so move the top portion 120 upwards and away from the base portion 110. During the motion of the chains 151, power is also supplied to the safety brake 156, such that it permits rotation of the axle 155. When the top portion 120 is in its desired position, the motor 153 deactivates and the safety brake 156 engages, thereby preventing motion of the chains 151 and holding the top portion 120 in position.

In order to lower the lift 100, a control signal is sent to the motor 153, driving the motor 153 to turn the axle 155 in the opposite direction, thereby driving the chains into their respective magazines. When a platform is mounted to the top portion 120, each mounting point 160 allows for adjustment in the x/y/z directions, thereby facilitating levelling of the platform. Alternatively, in the absence of a platform the mounting points 160 may be discarded and support legs 170 used to level the lift 100 instead.

In order to transport the lift 100, the lift 100 is fully retracted, whereupon it can be loaded into a container or lorry in a configuration that occupies minimal space.

Figure 11:
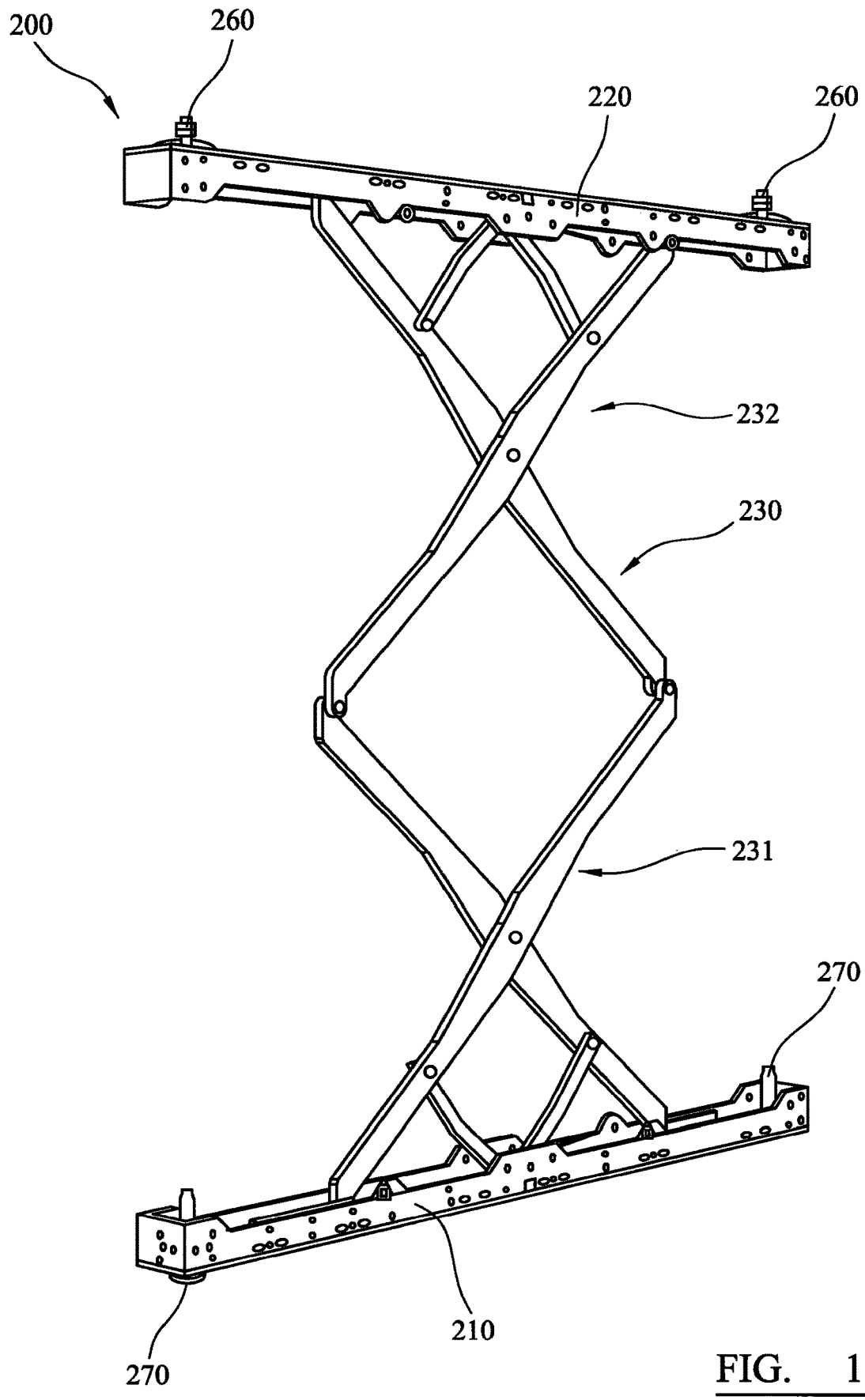
FIG. 11 is a perspective view of an exemplary passive scissor.

Turning now to FIG. 11, there is shown an exemplary passive scissor 200. The passive scissor 200 comprises a base portion 210, which is arranged on the floor or another support surface in use, and a top portion 220, upon which a load can be placed in order to be lifted. The passive scissor 200 further comprises a scissor assembly 230, which extends between the top portion 210 and the base portion 220.

In one example, the structure of the scissor assembly 230, and the means by which it couples to the top and base portions 220/210 are the same as or similar to one of the scissor subassemblies 130a/b of the scissor lift 100. The base portion 210 comprises support legs 270 the same as or similar to the support legs 170 of the scissor lift 100. The top portion 220 comprises mounting portions 260, the same as or similar to the mounting portions 160 of the scissor lift 100. Accordingly, for clarity, the description of these elements is not repeated.

In one example, the passive scissor 200 has the same length (e.g. 2 m) as the scissor lift 100. However, the passive scissor is substantially narrower (e.g. 0.15 m wide).

In use, the passive scissor 200 is coupled to a scissor lift 100, such that the rise and fall of the scissor lift 100 also causes the rise and fall of the passive scissor 200.

Example stage assembly arrangements comprising scissor lifts 100 and passive scissors 200 will now be discussed with reference to FIG. 12A-C.

Figure 12A:
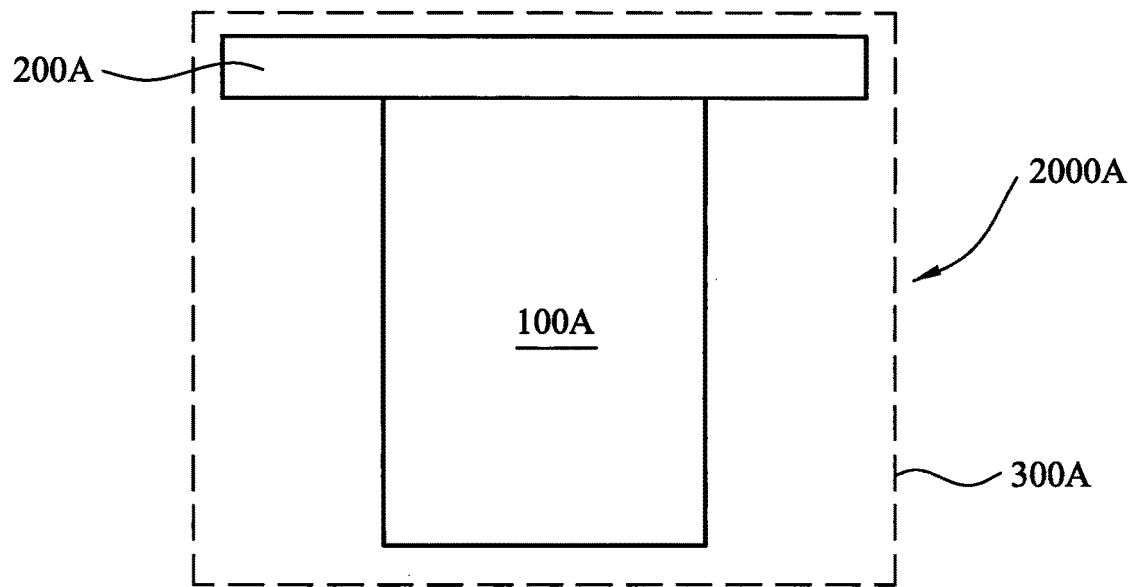
FIG. 12A-C are each schematic plan views of exemplary stage assemblies.

FIG. 12A shows a stage assembly 2000A in schematic plan view. The assembly 2000A comprises a scissor lift 100A and a passive scissor 200A. A long side of the passive scissor 200A is attached to one of the short side edges of the scissor lift 100A, so as to form a T shape. Each of the passive scissor 200A and scissor lift 100A may comprise apertures to receive mechanical fastenings for securing the devices to one another. For example, the flanges of top and base portions of each device may comprise apertures. It will be understood that the flanges may be provided with a plurality of apertures disposed at differing locations around the flanges, so as to facilitate coupling the passive scissor 200A and scissor lift 100A to one another, and to numerous other accessories, in various ways.

The scissor lift 100A and passive scissor 200A support a platform 300A. As the scissor lift 100A rises and falls, the passive scissor 200A directly coupled thereto rises and falls. Accordingly, the passive scissor 200A effectively provides a means for stabilising the platform 300A, and transmitting the lifting motion of the lift 100A to a wider area.

Figure 12B:
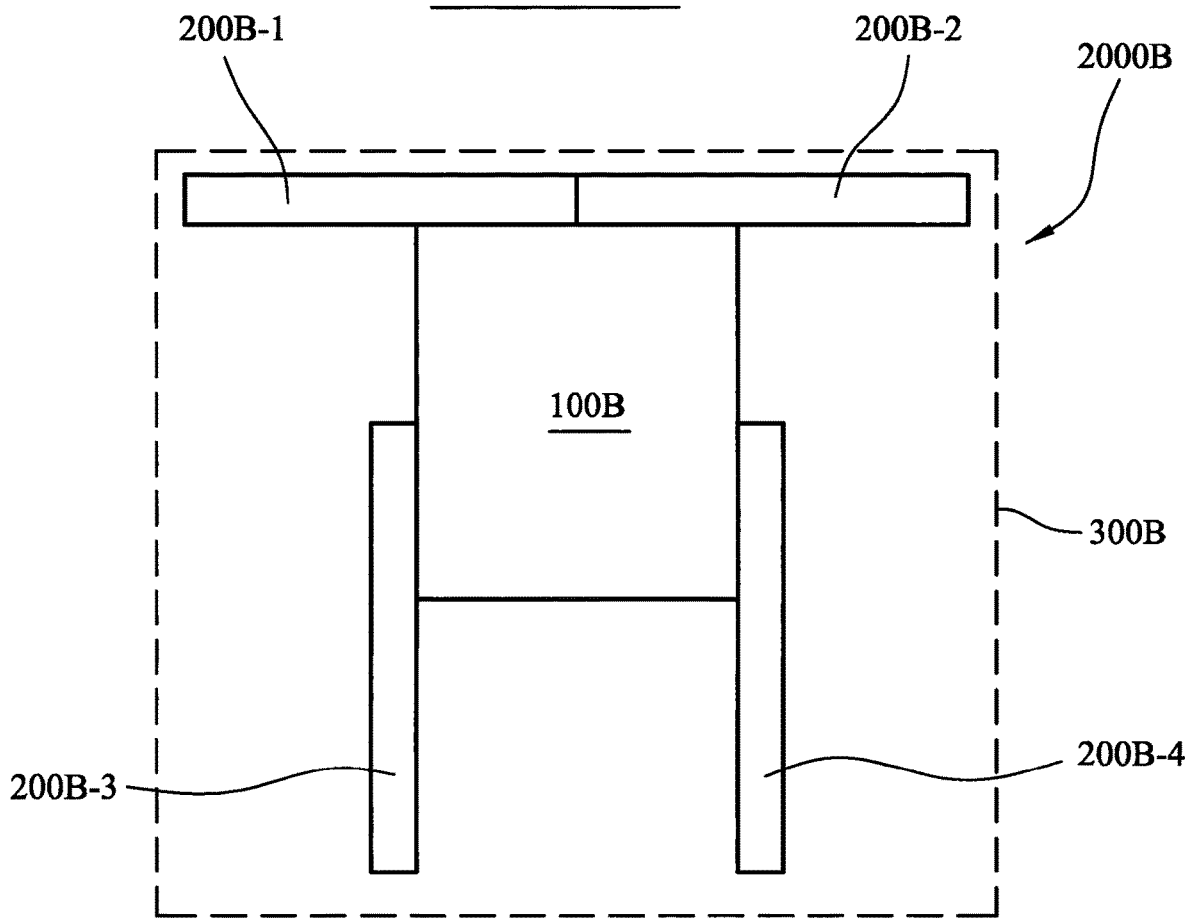

FIG. 12B shows an example stage assembly 2000B, similar to the stage assembly 2000A of FIG. 12A. However, in this example, four passive scissors 200B-1, 200-B2, 200B-3, 200B-4 are coupled to the scissor lift 100B. Two of the passive scissors 200B-1, 200B-2 are coupled to the short side of the scissor lift 100B, such that their long sides abut the short side. Accordingly, the overall width of the area supported is larger than in the stage assembly 2000B. In addition, two further passive scissors 200B-3, 200B-4 are respectively coupled to opposing longer sides of the scissor lift 100B. In particular, each passive scissor 200B-3, 200B-4 is arranged such that approximately half of its longitudinal extent coincides with the scissor 100B, thus extending the overall length of the area supported by the stage assembly 2000B.

Figure 12C:
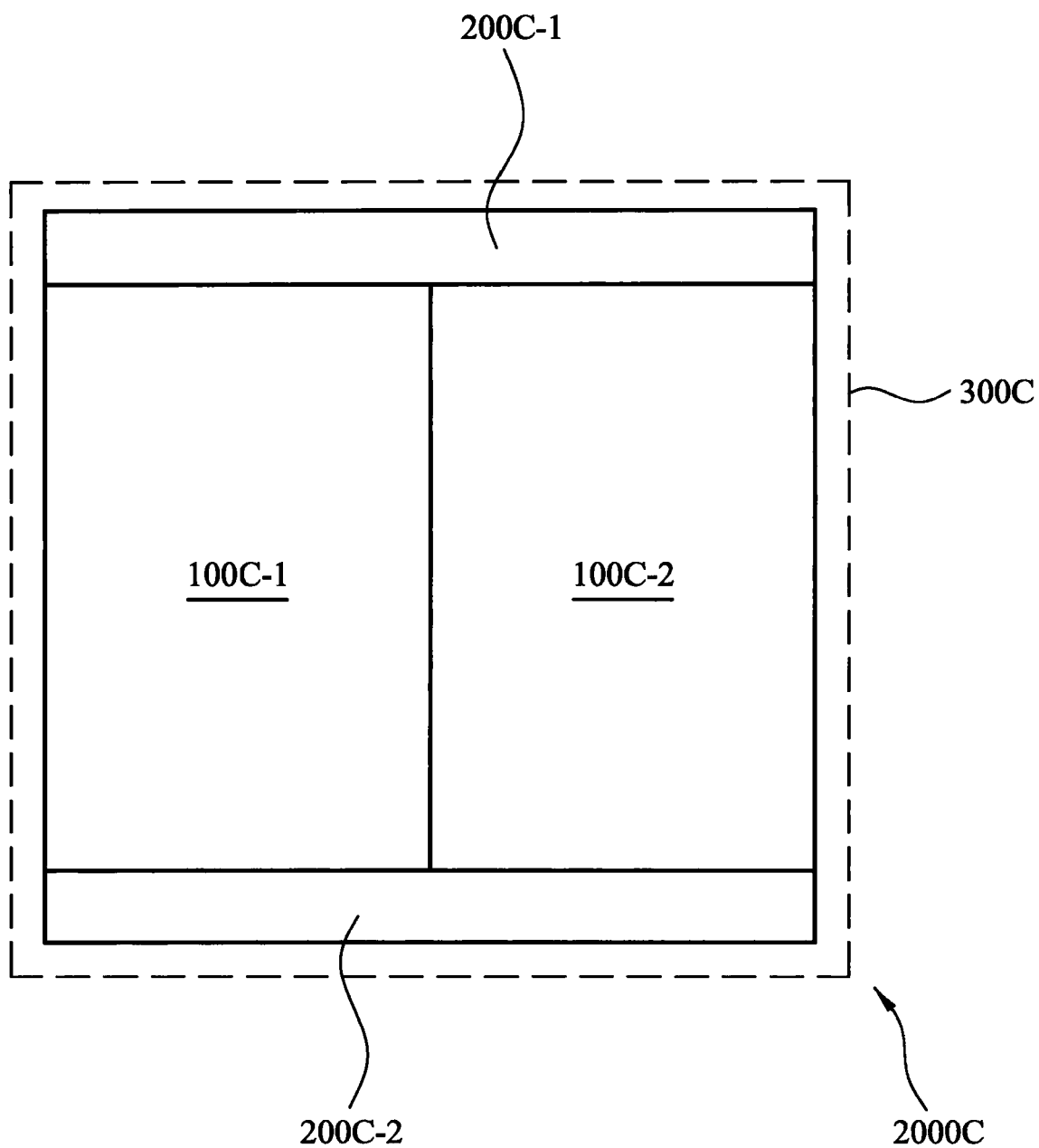

FIG. 12C shows an example stage assembly 2000C comprising two scissor lifts 100C-1, 100C-2 and two passive scissors 200C-1, 200C-2. Each passive scissor 200C is arranged to connect the short edges of the two lifts 100C. Accordingly, the lifts 100C act in tandem and greater stability is provided.

It will be appreciated that these are merely exemplary arrangements, and that more or fewer passive scissors 200 and scissor lifts 100 may be deployed in various configurations, depending on the size and weight of the load to be lifted. Although the examples above comprise a single platform 300, it will be understood that multiple platforms 300 can be used.

Various modifications within the scope of the invention will be apparent to those skilled in the art. For example, each scissor assembly could comprise a single scissor, or more than two scissors. The scissor lift may comprise more than two scissor subassemblies. In other examples, the scissor subassemblies need not be disposed in parallel or adjacent to one another. Whilst the examples shown comprise base portions and top portions of matching dimensions, it will be understood that these may differ in dimensions. It will be understood that in some examples, one or more the components (e.g. base portion, top portion, scissors) may be formed of or comprise steel or other heavier metals, in addition to, or instead of, aluminium.

In further examples, the top and/or bottom portions 120/110 may comprise access panels or hatches, for cable management and to facilitate access to the rigid chain lifting system 150. For example a hatch may be provided on the top plate 121.

The above-described scissor lift provides an advantageously lightweight and compact lift. The use of a rigid chain lifting system means that the scissors are provided for guidance rather than applying load, and thus can be fabricated from lighter, less strong material. In addition, the use of an AC servo motor allows for precise control of the lift, allowing for synchronous movement of multiple lifts during performances. In addition, the lift is fabricated substantially without welding, ensuring that the components do not warp during manufacturing and facilitating easy repair and fabrication.

In addition, the above-describe scissor lift can be operated in conjunction with one or more passive scissors, utilising the lifting power of the scissor lift to stably lift loads of differing sizes and shape. The scissor lift and passive scissors are advantageously modular, and can be deployed in many different configurations depending on the requirements of the show.

Advantageously, the scissor lift and passive scissors retract into a highly compact arrangement, thereby saving on travel costs.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A stage assembly comprising:
   a scissor lift for use in a stage assembly; the scissor lift comprising:
   a base portion configured to be supported on a floor or other support surface;
   a top portion configured to support a platform;
   a scissor arm assembly connecting the base portion and the top portion;
   a rigid chain lifting system comprising a plurality of rigid chains connecting the base portion and the top portion, wherein the scissor lift is configured such that extension and retraction of the plurality of rigid chains causes the top portion to rise and fall with respect to the base portion;

wherein the scissor arm assembly comprises two scissor arm subassemblies, each scissor arm subassembly comprising at least one pair of crossed arms connected at a pivot point to form a scissor, wherein uppermost arms of each scissor arm subassembly are being pivotally attached to the top portion by at least two upper support arms, and lowermost arms of each scissor arm subassembly are being pivotally attached to the base portion by at least two lower support arms, and wherein the base portion of the scissor lift comprising at least one track arranged and disposed to receive a wheel;

a plurality of bracing plates extending between the two scissor arm subassemblies, wherein the plurality of bracing plates are configured to move to a nested configuration when the rigid chain is retracted; each bracing plate of the plurality of the bracing plates comprises an upper plate, angled side plates extending obliquely downward from the upper plate toward the cross arms, and flanges connecting the side plates to the cross arms.

2. The stage assembly of claim 1, wherein the rigid chain lifting system comprises a pair of rigid chains.

3. The stage assembly of claim 1, wherein the rigid chain lifting system comprises an AC servo motor, to extend and retract the rigid chain.

4. The stage assembly of claim 3, where the motor is configured to drive an axle, the axle comprising a chain gear portion arranged to engage the rigid chain.

5. The stage assembly of claim 3, wherein the rigid chain lifting system comprises a safety brake, configured to be released upon supply of power to the AC servo motor and engaged upon cessation of the supply of power to the AC servo motor.

6. The stage assembly of claim 5, wherein the rigid chain lifting system comprises:
   a primary encoder, configured to determine the extent to which the rigid chain is deployed based on the motion of the motor;
   a secondary encoder, configured to determine the extent to which the rigid chain is deployed based on the motion of the axle, and
   the rigid chain lifting system is configured to engage the safety brake if the output of the primary encoder and secondary encoder indicate the rigid chain is deployed to a different extent.

7. The stage assembly of claim 1, wherein the rigid chain lifting system is disposed in the base portion.

8. The stage assembly of claim 1 wherein the base portion or top portion are connected to the scissor arm assembly with mechanical fasteners.

9. The stage assembly of claim 1, wherein the two scissor arm subassemblies are parallel.

10. The stage assembly of claim 9, wherein each of the scissor arm subassemblies comprises two pairs of crossed arms, so as to form a double scissor.

11. The stage assembly of claim 9, wherein the two scissor arm subassemblies are symmetrical in a notional vertical plane extending through pivot points of the scissors.

12. The stage assembly of claim 11, wherein the rigid chain is arranged between the two scissor arm subassemblies, on the notional vertical plane.

13. The stage assembly of claim 1, wherein the top portion comprises a plurality of mounting points configured for the mounting of the platform thereto, each mounting point being adjustable in x, y and z directions.

14. The stage assembly of claim 1, wherein the height of the scissor lift in a fully retracted state is under 1 m.

15. A stage assembly as defined in claim 1 and an automation control system configured to remotely control the scissor lift of the stage assembly.

16. The stage assembly of claim 1, wherein the plurality of bracing plates are made of a stronger material than the scissor arm assembly.

17. The stage assembly of claim 1, wherein each bracing plate of the plurality of bracing plates is mechanically fastenable on a respective cross arm of the cross arms at each side of a pivot point.

18. The stage assembly of claim 1, wherein each bracing plate of the plurality of bracing plates is substantially trapezoidal in cross-section.

19. The stage assembly of claim 1, wherein each bracing plate of the plurality of bracing plates comprises cutaway portions.

20. A passive scissor for use in a stage assembly comprising:
   a base portion configured to be supported on a floor or other support surface;
   a top portion configured to support a platform;
   a scissor arm assembly connecting the base portion and the top portion,
   wherein the passive scissor is configured to be coupled to the scissor lift of the stage assembly of claim 1, such that the rise and fall of the top portion of the scissor lift causes the rise and fall of the top portion of the passive scissor.

21. A method of operating a stage assembly according to claim 1, wherein the method comprises:
   operating the rigid chain lifting system to cause the rigid chain to extend and cause the top portion to rise with respect to the base portion; or
   operating the rigid chain lifting system to cause the rigid chain to retract and cause the top portion to fall with respect to the base portion.

22. A method according to claim 21, wherein the operation of the stage assembly conveys artists, musical equipment, lighting equipment or other stage equipment on the top portion.

* * * * *